United States Patent
Moriyama et al.

[11] Patent Number: 5,189,311
[45] Date of Patent: Feb. 23, 1993

[54] CRASH SENSOR

[75] Inventors: Hiroshi Moriyama; Hiroyuki Sada; Takeo Shiozawa, all of Kobe, Japan

[73] Assignee: Sensor Technology Co., Ltd., Kobe, Japan

[21] Appl. No.: 645,258

[22] Filed: Jan. 24, 1991

[30] Foreign Application Priority Data

Jan. 29, 1990 [JP] Japan ................................. 2-19979
Mar. 23, 1990 [JP] Japan ................................. 2-74457

[51] Int. Cl.$^5$ ............................................. G06G 7/18
[52] U.S. Cl. ............................... 307/10.1; 364/424.05
[58] Field of Search .................. 364/424.01, 424.05; 280/735; 180/274, 282, 281; 340/456, 458; 307/10.1, 121

[56] References Cited

U.S. PATENT DOCUMENTS

| | | | |
|---|---|---|---|
| 3,701,903 | 10/1972 | Merhar ............................. | 307/9 |
| 3,870,894 | 3/1975 | Brede et al. ........................ | 307/9 |
| 4,166,641 | 8/1977 | Okada et al. ...................... | 280/735 |
| 5,068,793 | 11/1991 | Coudne et al. .................. | 364/424.05 |

Primary Examiner—A. D. Pellinen
Assistant Examiner—Aditya Krishnan
Attorney, Agent, or Firm—Oblon, Spivak, McClelland, Maier & Neustadt

[57] ABSTRACT

An electronic crash sensor which can operate appropriately in response to any form of crash of a vehicle. An input acceleration waveform from an accelerometer is first processed to peak cut any portion thereof lower than a predetermined value. Then, a value obtained such peak cutting is time integrated. Then, a time integrated value of a predetermined function is subtracted from a value obtained by such time integration. Then, the value of the acceleration waveform thus obtained is compared with a predetermined time function value, and when the former is higher than the latter, a triggering signal is delivered to a trigger circuit to trigger operation of a passenger protecting apparatus such as an air bag of the vehicle.

10 Claims, 10 Drawing Sheets

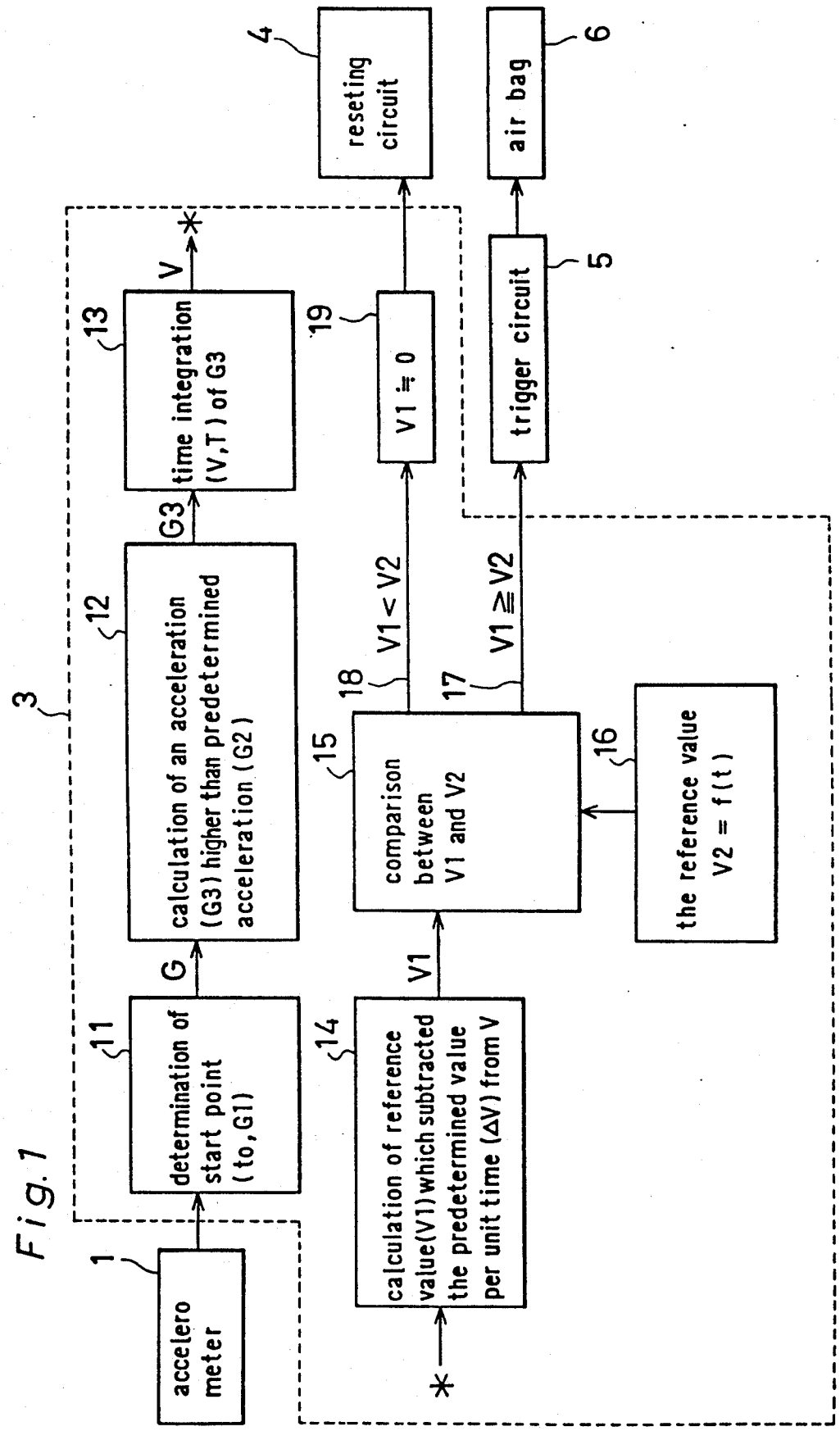

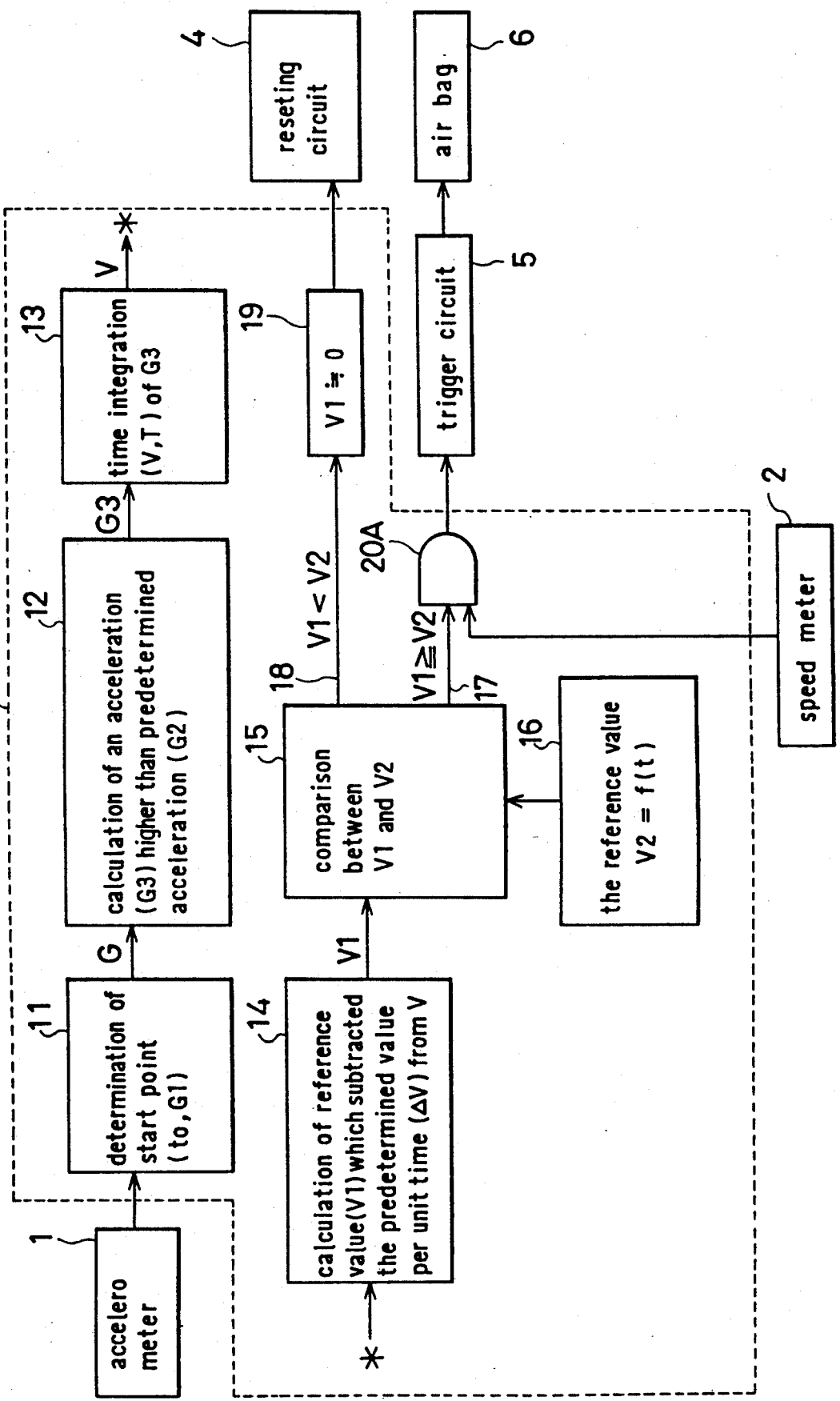

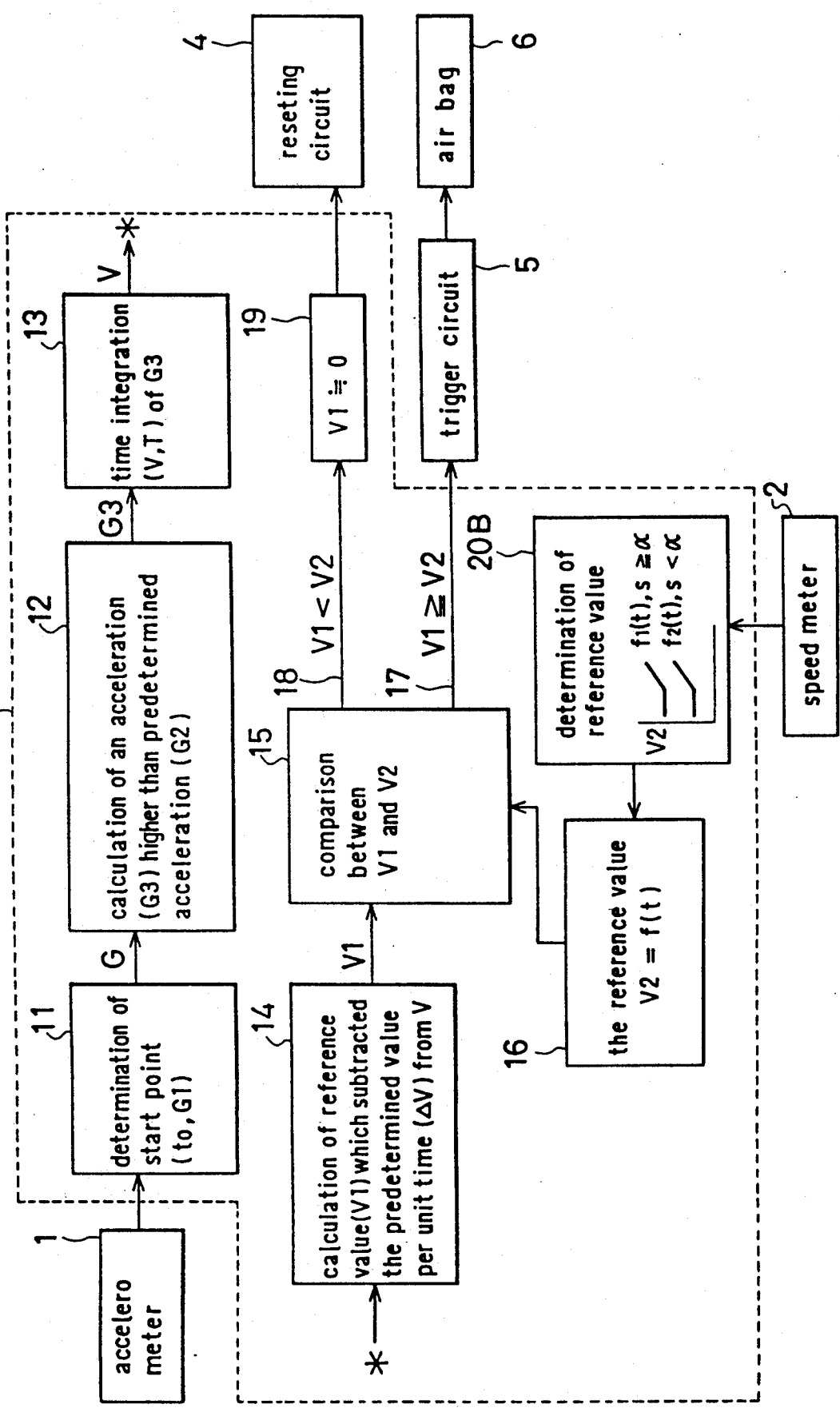

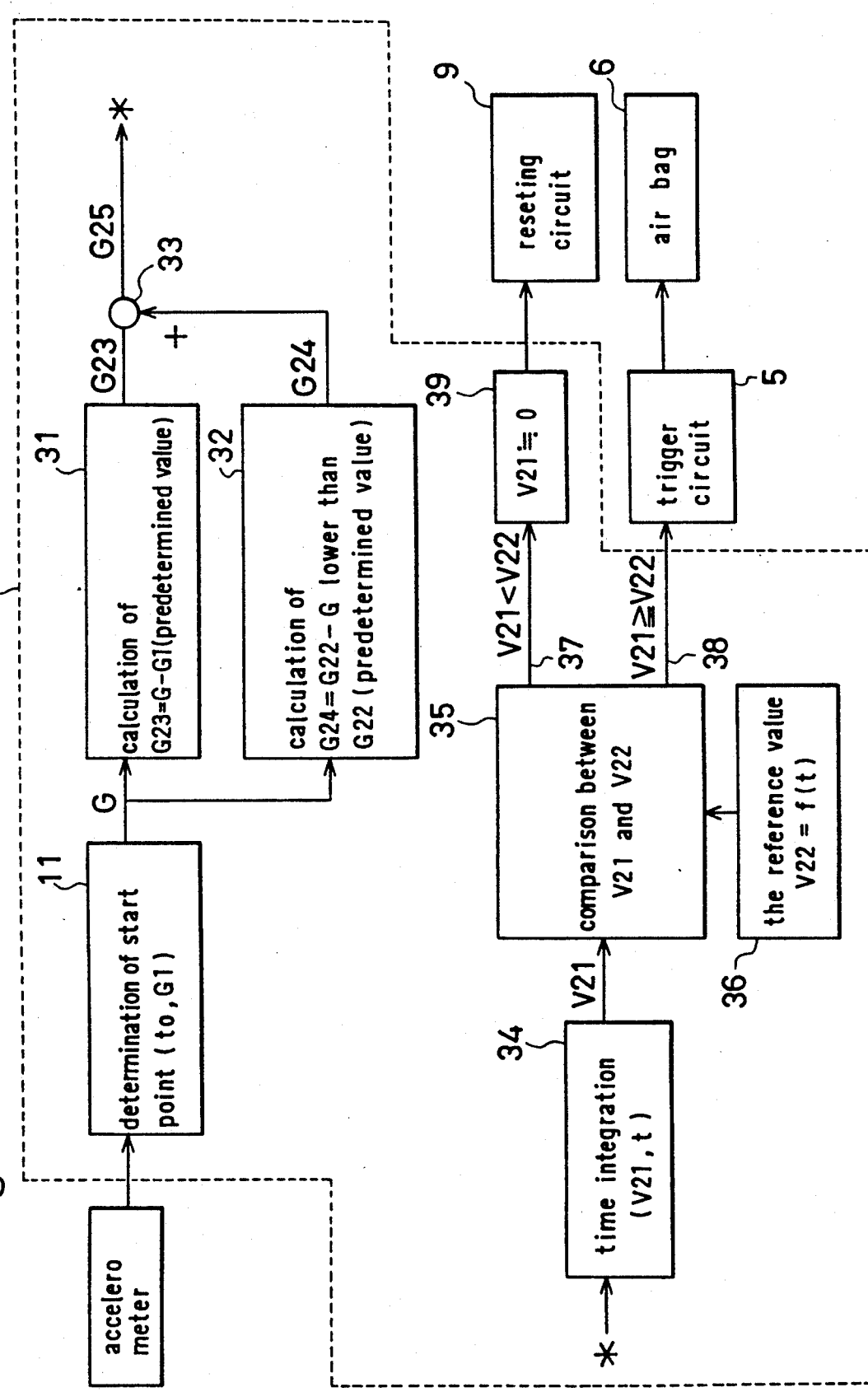

CRASH SENSOR

BACKGROUND OF THE INVENTION

1. Field of the Invention

This invention relates to a crash sensor suitable for use for the detection of crash of a vehicle with a triggering system of a passenger protecting apparatus such as an air bag.

2. Description of the Prior Art

Conventionally, crash sensors suitable for use for the detection of crash of a vehicle with a triggering system of a passenger protecting apparatus such as an air bag are divided into two types including a first type which employs a sensing mass and a second electronic type which employs an accelerometer. As a crash sensor which belongs to the electronic type, a crash sensor is already known which time integrates an acceleration waveform from an accelerometer and causes a passenger protecting apparatus such as an air bag to trigger its operation when the time integrated value exceeds a predetermined value. One of such crash sensors is disclosed, for example, in U.S. Pat. No. 3,701,903. A modified crash sensor is disclosed in U.S. Pat. No. 3,911,391. Wherein, before time integration is performed, a predetermined acceleration is subtracted from an acceleration waveform so that the passenger protecting apparatus may not be rendered operative when an acceleration waveform of such a degree as will not hurt a passenger is inputted such as when the vehicle rides on a rough road.

With the crash sensor, however, operation of the passenger protecting apparatus cannot always be triggered within a required period of time in all forms of crash which are forecast with an actual vehicle. Particularly, decelerations upon head-on crash in a low speed region which does not require the passenger protecting apparatus and upon oblique crash or pole crash in a high speed region in which the passenger protecting apparatus is required are very similar to each other and cannot be identified from each other at an initial stage of crash until operation of the passenger protecting apparatus is triggered. In particular, as seen in FIG. 9, an acceleration waveform (shown by a broken line curve) upon such low speed head-on crash as does not require triggering of operation of the passenger protecting apparatus and another acceleration waveform (shown by a solid line curve) upon oblique crash or pole crash in a high speed region upon which triggering of operation of the passenger protecting apparatus is required are very similar to each other at such a period of time at an initial stage of crash as given as a section from ① to ② in FIG. 9 in which it must be determined whether or not operation of the passenger protecting apparatus should be triggered. Accordingly, as shown FIG. 10, it is difficult to identify them from each other even with a crash sensor wherein a predetermined acceleration is subtracted from an acceleration waveform and then the difference thus obtained is time integrated (V1'). As a result, if priority is given to a triggering requirement, unnecessary triggering of operation will take place in a low speed region. On the contrary, if priority is given to a no triggering requirement, a delay or lack in triggering will take place upon high speed oblique crash or pole crash.

SUMMARY OF THE INVENTION

It is an object of the present invention to provide an electronic crash sensor which can operate appropriately in response to any form of crash of a vehicle.

In order to attain the object, according to one aspect of the present invention, there is provided a crash sensor which detects crash of a vehicle from an acceleration waveform of an accelerometer to trigger operation of a passenger protecting apparatus comprising means for peak cutting any portion of the inputted acceleration waveform lower than a predetermined value, means for time integrating a value obtained by such peak cutting, means for subtracting a time integrated value of a predetermined function from a value obtained by such time integration, and means for comparing a value obtained by such subtraction with a predetermined time function value to develop a triggering signal.

According to another aspect of the present invention, there is provided a crash sensor which detects crash of a vehicle from an acceleration waveform of an accelerometer to trigger operation of a passenger protecting apparatus comprising means for peak cutting any portion of the inputted acceleration waveform lower than a predetermined value and subtracting another predetermined value from the inputted acceleration waveform, means for time integrating a value obtained by such peak cutting and such subtraction, and means for comparing a value obtained by such time integration with a predetermined time function value to develop a triggering signal.

While acceleration waveform upon low speed head-on crash and upon high speed oblique crash are almost same in average acceleration at an initial stage of crash which coincides with a triggering request time, an acceleration waveform upon high speed oblique crash has considerable vibration components as seen in FIG. 9 due to buckling, vibrations and so forth of a car body. Meanwhile, since most of the inpact energy upon low speed head-on crash is absorbed by an energy absorbing apparatus such as a bumper, vibration components are not so considerable. The present invention has been made perceiving such differences in the characteristics between the two acceleration waveforms. Thus, according to the present invention, an acceleration waveform is time integrated form which bottom portions thereof are removed either by peak cutting any portion of an inputted acceleration waveform lower than a predetermined value, time integrating a value obtained by such peak cutting and subtracting a time integrated value of a predetermined function from a value obtained by such time integration or by peak cutting any portion of an inputted acceleration waveform lower than a predetermined value and subtracting another predetermined value from the inputted acceleration waveform, and time integrating a value obtained by such peak cutting and such subtraction. Accordingly, such time integrated value of an acceleration upon high speed oblique crash which involves high vibration components is greater than a time integrated value of a mere difference of an acceleration from a fixed acceleration. Consequently, identification between low speed head-on crash and high speed oblique crash can be made with a higher degree of accuracy. Accordingly, unnecessary triggering of operation in a low speed region and a delay in or lack of triggering of operation upon high speed oblique crash or pole crash can be prevented. Besides, since bottom portions of an acceleration waveform are cut, even if an acceleration higher than ever is subtracted from an original acceleration waveform, it is still possible to identify it, and consequently, no triggering of a passenger protecting apparatus in such a case wherein no hurt will be provided to a passenger as upon riding of the vehicle on a rough road can be prevented with a higher degree of certainty. Further, since a reference value to be provided to the comparing means which develops a triggering signal is not a fixed value as in a conventional apparatus but a time function, further precise and clear identification between them is assured. In addition, where the time integrating operation is reset when the time integrated value comes to a value around zero, the time (graduations) of the time function as the reference value is provided by simple processing. Consequently, a concept of time can be introduced readily into determination whether or not a triggering signal should be delivered to the passenger protecting apparatus, which enables such clear identification as described above.

The above and other objects, features and advantages of the present invention will become apparent from the following description and the appended claims, taken in conjunction with the accompanying drawings.

BRIEF DESCRIPTION OF THE DRAWINGS

FIG. 1 is a block diagram of a crash sensor showing a first embodiment of the present invention;

FIGS. 4(a) and 4(b) are block diagrams of different modified crash sensors;

FIG. 7 is a block diagram of a further crash sensor showing a third embodiment of the present invention;

DETAILED DESCRIPTION OF THE PREFERRED EMBODIMENTS

Figure 2A:
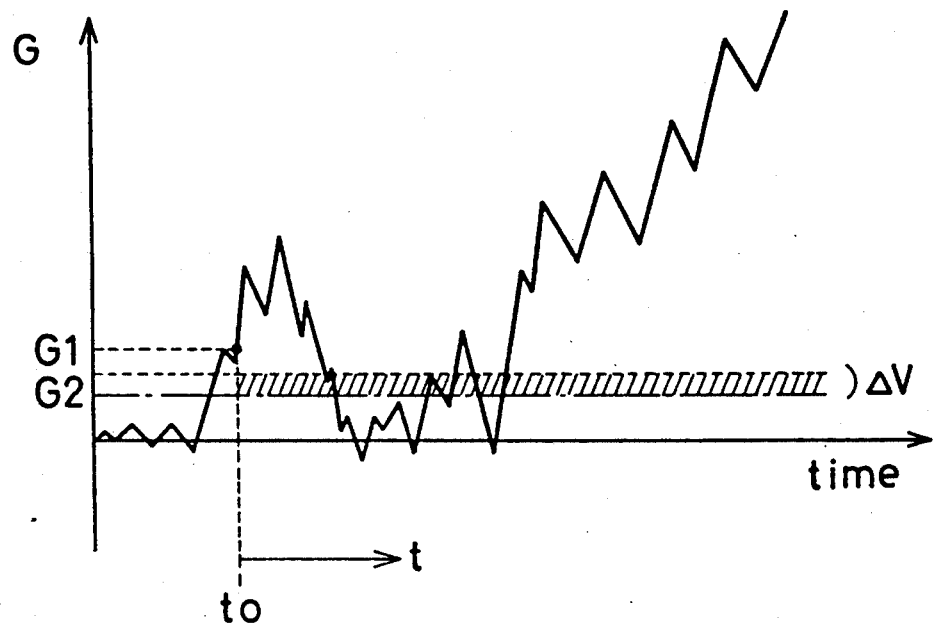
FIGS. 2(a) and 2(b) are acceleration diagrams illustrating operation of the crash sensor of FIG. 1.

Before the present invention is described in detail in connection with several embodiments thereof, it is to be noted here that an acceleration on the deceleration side, that is, a deceleration, is described as having a positive value in the following description. However, even if it otherwise has a negative value, similar results will be obtained if positive or negative logic is matched among various blocks.

Referring first to FIG. 1, there is shown a crash sensor according to a first preferred embodiment of the present invention. The crash sensor shown includes an accelerometer 1 connected to a resetting circuit 4 and a trigger circuit 5 by way of an operating circuit 3. The trigger circuit 5 is connected to operate an air bag 6 which serves as a passenger protecting apparatus. The operating circuit 3 includes a block 11 which determines a point of time t0 at which an acceleration G measured by the accelerometer 1 exceeds a predetermined acceleration G1. At another block 12, calculation of an acceleration G3 higher than another predetermined acceleration G2 is started at the point of time t0. In this instance, an acceleration lower than the acceleration G2 is regarded as equal to 0. Then at a further block 13, time integration of the acceleration G3 is started to calculate an intergration value V. At a still further block 14, an integrated value of a predetermined function is subtracted from the integration value V. At the block 14, the predetermined function has a fixed value ΔV, and the predetermined value ΔV per unit time is subtracted from the integration value V to obtain a reference value V1. Then at a yet further block 15, the reference value V1 is compared with a reference value V2 determined in advance at a yet further block 16 as time passes. Then, when the reference value V1 exceeds the reference value V2, a signal is transmitted from the block 15 to the trigger circuit 5 by way of a line 17. On the contrary, when the reference value V1 does not exceed the reference value V2 on another line 18 and it is detected at a yet further block 19 that the reference value V1 is proximate to zero, that is, a negative value or a small positive value, a signal is delivered to the resetting circuit 4 to stop the time integrating operation and reset the reference value V1 and the time t to zero.

Figure 2B:
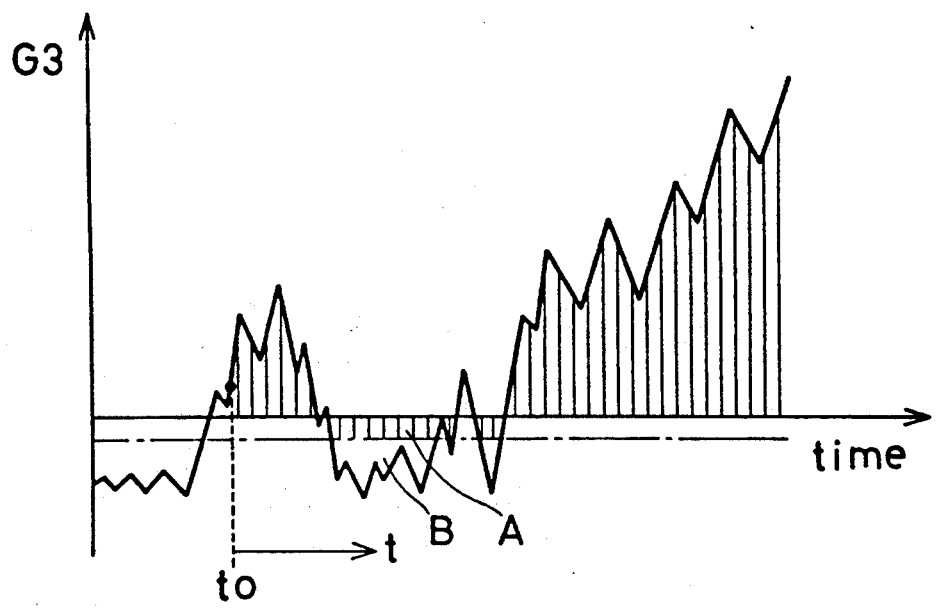

Operation at the block 11 to 14 described above will be described subsequently with reference to FIGS. 2(a) and 2(b). In particular, referring first to FIG. 2(a), operation is started at the point of time t0 at which the acceleration G exceeds the value G1. Then, the acceleration G is regarded as equal to zero when it is lower than the predetermined value G2, and time integration is performed with the acceleration G when the acceleration G is higher than the value G2. Then, the predetermined value ΔV per unit time shown by a shadowed portion of FIG. 2(a) is substrated from the acceleration G exceeding the value G2. This corresponds to time integration of a shadowed portion or portions in FIG. 2(b) and makes the reference value V1. In particular, while the shadowed portion A is added as a negative value, another portion B is cut. It is to be noted that the predetermined value G2 is a positive value including G1=G2. Meanwhile, if the function of the aforementioned resetting circuit 4 is used, then starting or resetting of integration can be performed without consciousness of a starting timing.

Figure 3:
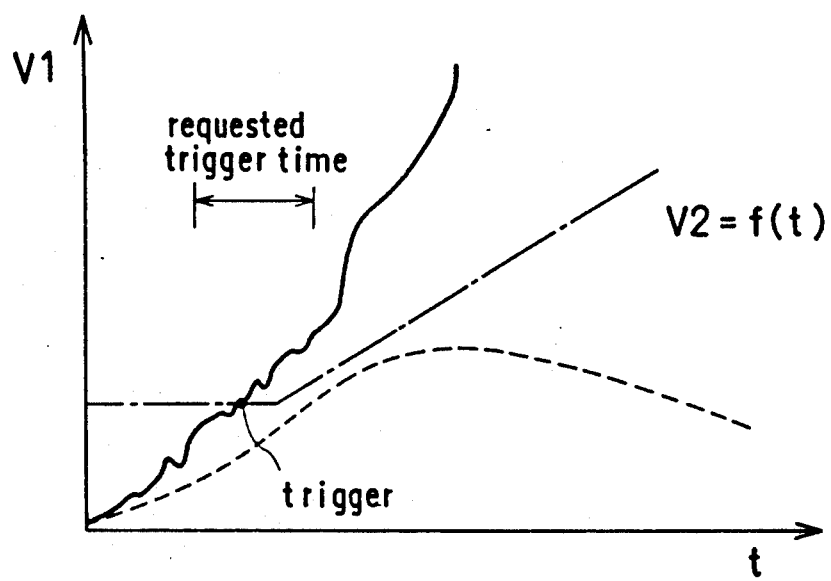
FIG. 3 is a diagram illustrating a variation of a time integrated value of the crash sensor of FIG. 1.
Figure 10:
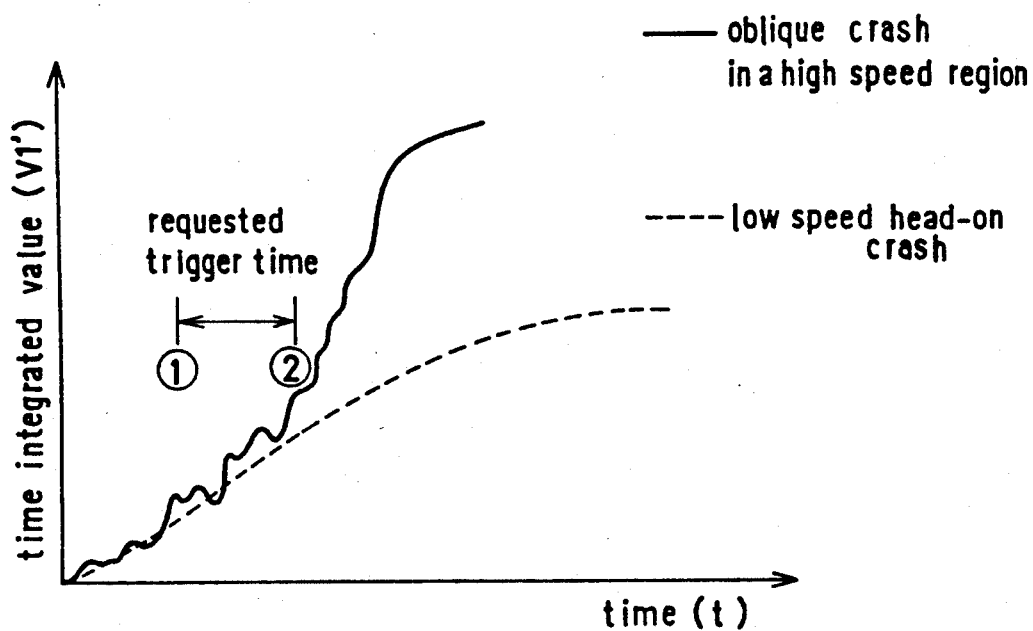
FIG. 10 is a diagram illustrating a variation of time integrated values of a conventional crash sensor.

Subsequently, operation of the aforementioned operating circuit 3 will be described with reference to FIG. 3. While a result of time integration of a difference of a fixed acceleration from an acceleration G little presents a distinction between high speed oblique crash and low speed head-on crash as in the case of FIG. 10 described hereinabove, the two cases are distinguished clearly from each other in FIG. 3. Where the reference value V2 of the predetermined time function is set in advance as indicated by chain dash line in FIG. 3, two requirements of no operation upon low speed head-on crash and firing within a triggering request time upon high speed oblique crash or pole crash can be satisfied.

Referring now to FIG. 4(a), there is shown a modification to the crash sensor shown in FIG. 1. The modified crash sensor includes a speedometer 2 in addition to the accelerometer 1, and the operating circuit 3 thereof additionally includes an AND circuit 20A. In particular, the operating circuit 3 delivers a signal to the trigger circuit 5 when a signal indicating that the value V1 exceeds the value V2 and another signal that the actual speed of the vehicle is higher than a predetermined speed are inputted from the block 15 and the speedometer 2, respectively, to the AND circuit 20A. Consequently, determination between no operation upon low speed head-on crash and triggering of operation upon high speed oblique crash or pole crash can be made further clearly.

Referring now to FIG. 4(b), there is shown another modification to the crashg sensor shown in FIG. 1. The modified crash sensor is a modification to the modified crash sensor shown in FIG. 4(a) in that an additional block 20B for selectively determining a reference value V2 is provided in the operating circuit 3 in place of the AND circuit 20A. In particular, a reference value V2 is selectively determined at the block 20B in response to a speed level signal received from the speedometer 2 in order to raise the accuracy in determination of triggering when the vehicle is running at a medium speed. For example, when the speed S is equal to or higher than a predetermined value $\alpha$, a function $f_1(t)$ is determined as a reference value, but when the speed S is lower than the value $\alpha$, another function $f_2(t)$ is determined as a reference value. It is to be noted that preferably a value a little before time integration is performed is used as the speed of the speedometer 2.

By the way, the predetermined value $\alpha V$ at the block 14 in FIGS. 1, 4(a) and 4(b) may be replaced by a value of a function, for example, a value of a function of the integration value V at the point of time. Meanwhile, time integration of the acceleration G3 at the block 13 may be replaced by time integration of the K-th power ($K \geq 1$) of the acceleration G or n-th integration of the acceleration G3 or a combination of such time integration and n-th integration in order to distinguish clearly between oblique crash in a high speed region and low speed head-on crash. Further, while a signal is delivered from the block 19 when the value V1 becomes proximate to zero, such signal may otherwise be developed when the value V1 becomes lower than a predetermined value V3 or when the value V1 becomes lower than a certain value V4 of a function of the acceleration G3 at the point of time. Further, the acceleration G to be used at the block 11 may be replaced by a value Gx obtained by subtracting, from the acceleration G, a value Gf obtained by processing the acceleration G by means of a filter having a time constant longer than 5 seconds in order to eliminate a possible influence of zero drift of the accelerometer to raise the accuracy in operation.

Further, in order to make it further clear to establish distinction between no operation upon low speed head-on crash and triggering within a triggering request time upon high speed oblique crash or pole crash, a mounting structure for the accelerometer 1 may be oscillated in a frequency ranging fromm 50 to 20,000 Hz (in vibration characteristic in an advancing direction of the automobile) to amplify the acceleration G. Further, an electric circuit of the accelerometer 1 may have an amplification range of a particular frequency band.

Figure 5:
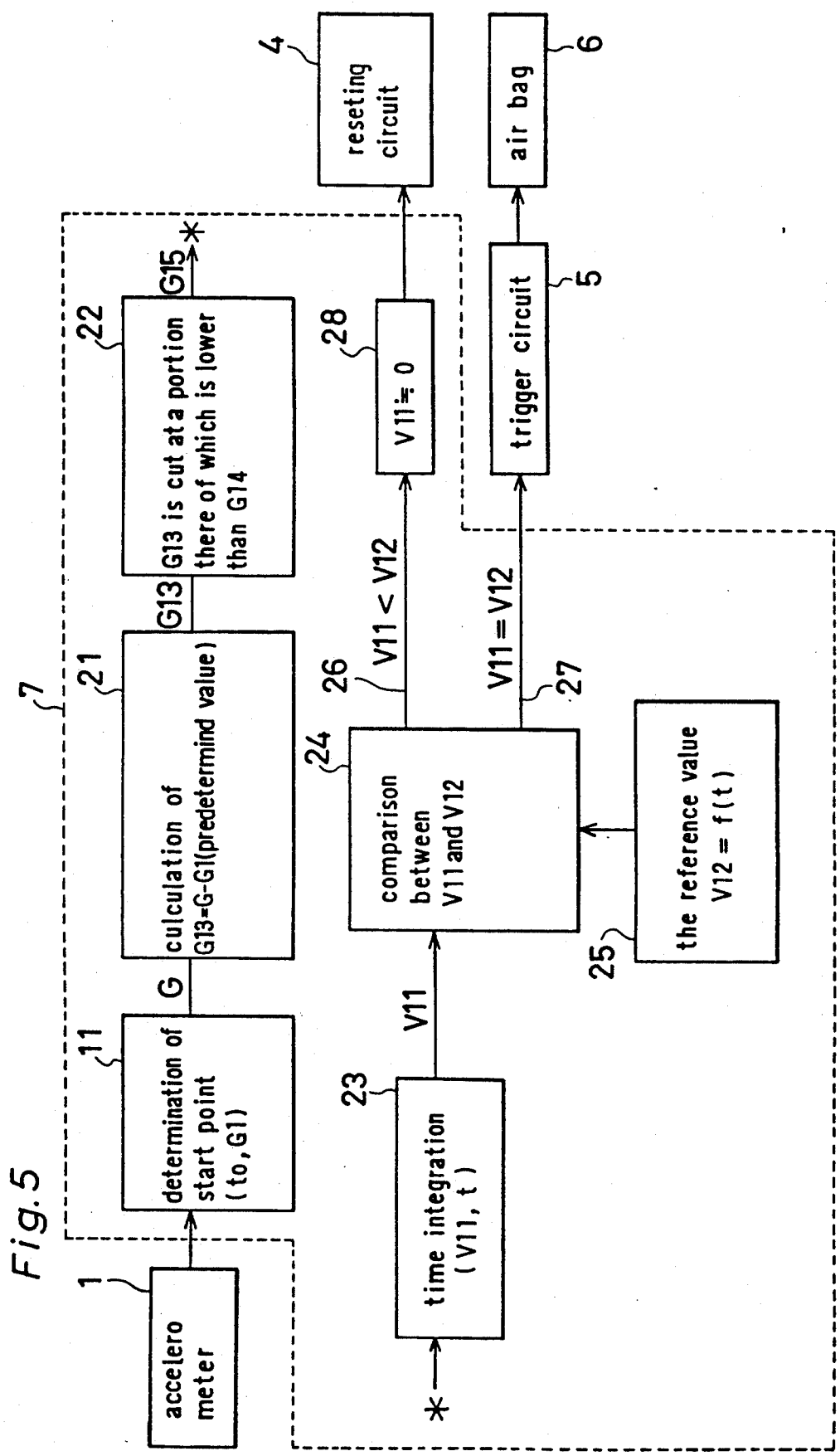
FIG. 5 is a block diagram of another crash sensor showing a second embodiment of the present invention.

Referring now to FIG. 5, there is shown a crash sensor according to a second preferred embodiment of the present invention. The crash sensor is similar in construction to but different from the crash sensor shown in FIG. 1 in that it includes a modified operating circuit 7 in place of the operating circuit 3. In particular, the modified operating circuit 7 includes a block 11 similar to the block 11 of the operating circuit 3. Then at a next block 21, a predetermined value G1 is substracted from a measured acceleration G to calculate a value G13. Then at another block 22, the value G13 is cut at a portion thereof which is lower than another predetermined value G14 normally having a negative value to calculate a value G15. Then at a subsequent block 23, the value G15 is time integrated. A value thus obtained by such time integration is thereafter processed and transmitted in a similar manner as in the crash sensor of FIG. 1 by subsequent blocks including blocks 24, 25 and 28 and by way of lines 26 and 27 which correspond to the blocks 15, 16 and 19 and lines 18 and 17, respectively.

Figure 6A:
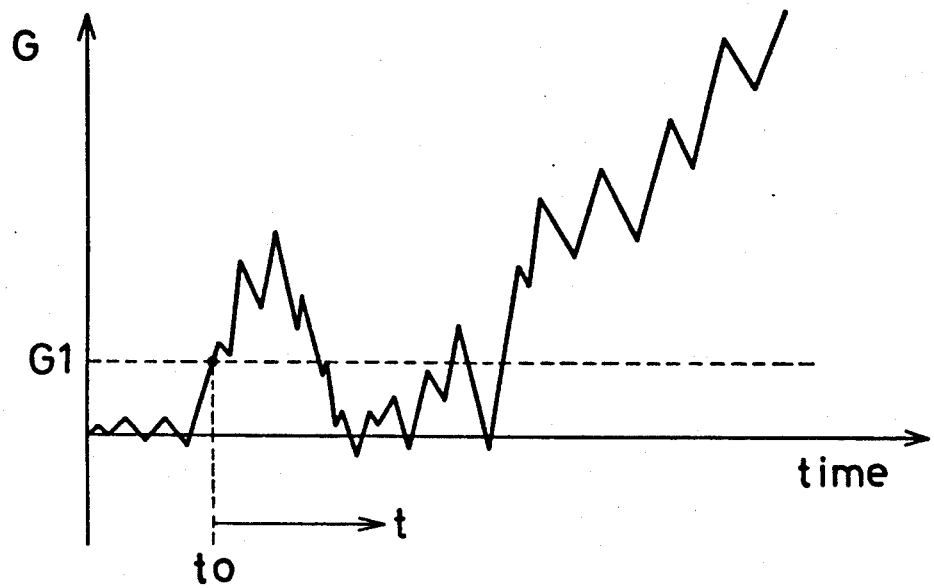
FIGS. 6(a) and 6(b) are acceleration diagrams illustrating operation of the crash sensor of FIG. 5.
Figure 6B:
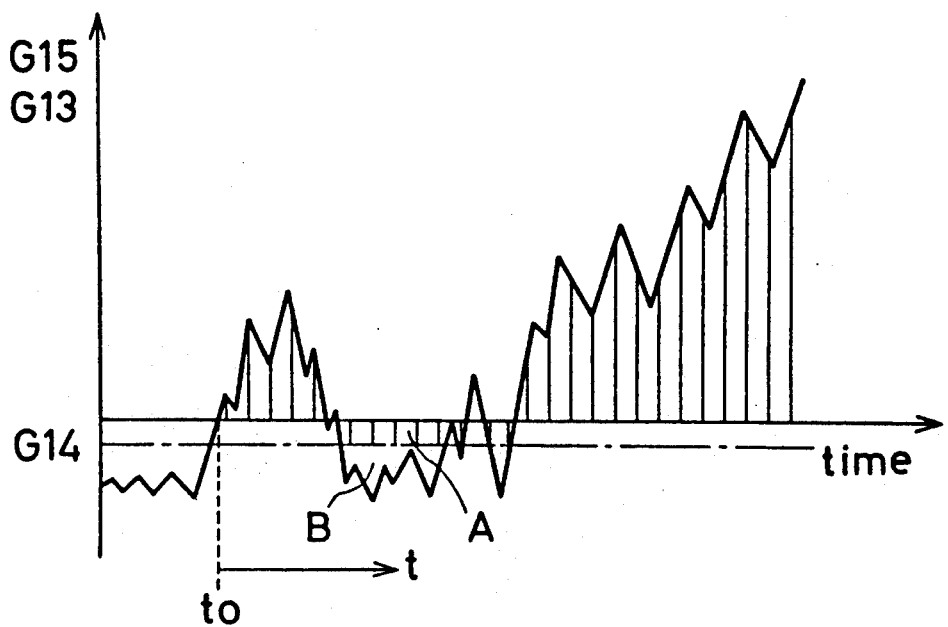

The value G1 at the block 21 is set in advance as a value corresponding to a vertical position G1 shown in FIG. 6(a). Then at the block 23, a shadowed portion or portions of FIG. 6(b) are integrated. In particular, while the shadowed portion A is added as a negative value similarly as in the case of FIG. 2(b), another portion B is cut. It is to be noted that the predetermined value G14 mentioned above may otherwise be a function value or may be a function, for example, of a negative portion of the value G13.

Referring now to FIG. 7, there is shown a crash sensor according to a third preferred embodiment of the present invention. The crash sensor is similar in construction to but different from the crash sensor shown in FIG. 1 in that includes a modified operating circuit 8 in place of the operating circuit 3. In particular, the modified operating circuit 8 includes a block 11 similar to the block 11 of the operating circuit 3. Then at a next block 31, a predetermined value G1 is subtracted from a measured acceleration G to calculate a value G23. Simultaneously at another block 32, a portion of the acceleration G lower than a predetermined value G22 is subtracted from the predetermined value G22 to calculate a value G24. Then at an adder 33, a sum G25 of the values G23 and G24 is calculated. The value G25 is time integrated at a subsequent block 34. A value thus obtained by such time integration is thereafter processed and transmitted in a similar manner as in the crash sensor of FIG. 1 by subsequent block including blocks 35, 36 and 39 and by way of lines 37 and 38 which correspond to the blocks 15, 16 and 19 and lines 18 and 17, respectively.

Figure 8A:
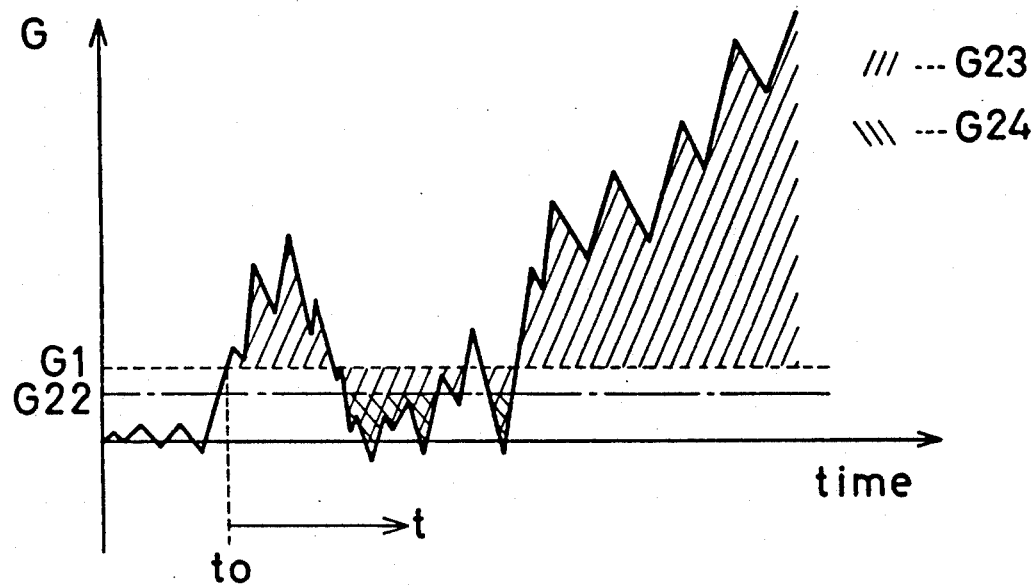
FIGS. 8(a) and 8(b) are acceleration diagrams illustrating operation of the crash sensor of FIG. 7.
Figure 8B:
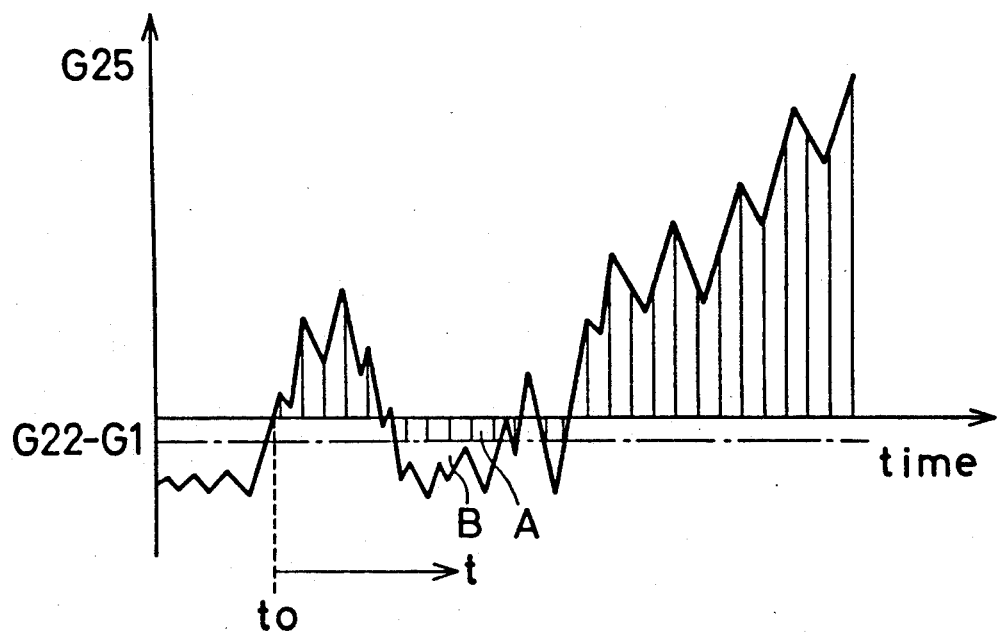
Figure 9:
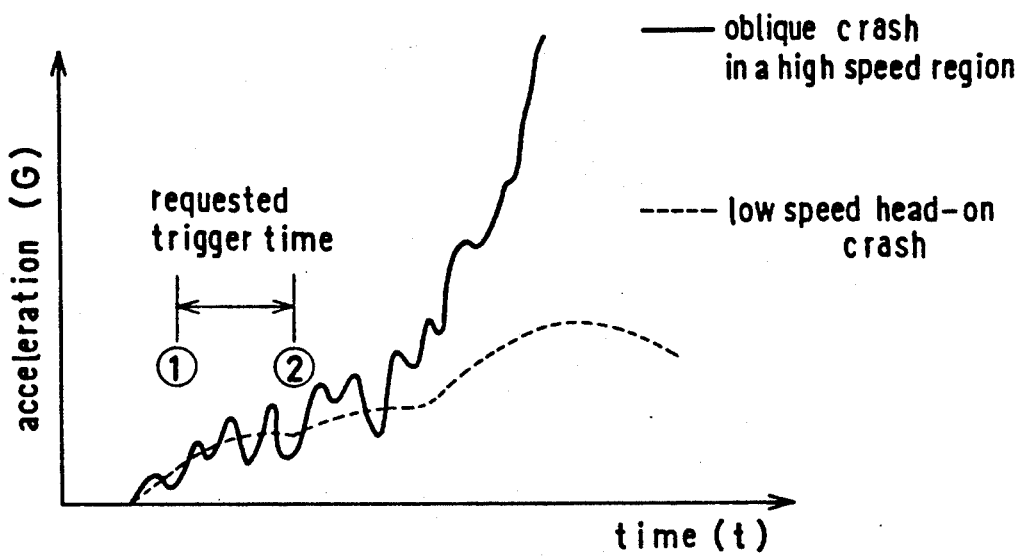
FIG. 9 is a diagram illustrating a time variation of accelerations.

Referring to FIG. 8(a), the value G23 at the block 31 is shown as a portion or portions shadowed with rightwardly upwardly inclined hatching lines while the value G24 at the block 32 is shown as a portion or portions shadowed with rightwardly downwardly inclined hatching lines. Then, a shadowed portion of portions of FIG. 8(b) are integrated at the block 34. In particular, while the shadowed portion A is added as a negative value similarly as in the case of FIG. 2(b), another portion B is cut. It is to be noted that the predetermined value G22 mentioned above may otherwise be a function value similarly as in the second embodiment described hereinabove.

Having now fully described the invention, it will be apparent to one of ordinary skill in the art that many changes and modifications can be made thereto without departing from the spirit and scope of the invention as set forth herein.

What is claimed is:

1. A crash sensor which detects crash of a vehicle from an acceleration waveform of an accelerometer to trigger operation of a passenger protecting apparatus, comprising:

means for peak cutting any portion of the inputted acceleration waveform lower than a predetermined value;

means for time integrating a value obtained by such peak cutting;

means for subtracting a time integrated value of a predetermined function ΔV per unit time from a value obtained by such time integration; and means for comparing a value obtained by such subtraction with a predetermined time function value to develop a triggering signal.

2. A crash sensor which detects crash of a vehicle from an acceleration waveform of an accelerometer to trigger operation of a passenger protecting apparatus, comprising:

means for subtracting a first predetermined value from said waveform to define an upper area above said first predetermined value and a bottom area below said first predetermined value;

means for subtracting a second predetermined value from the inputted acceleration waveform to reduce the size of said bottom area;

means for time integrating said upper area and the reduced size bottom area; and means for comparing a value obtained by such time integration with a predetermined time function value to develop a triggering signal.

3. A crash sensor according to claim 1 or 2, further comprising an AND circuit for receiving a signal indicative of a speed higher than a predetermined level from a speedometer and a signal from said comparing means to develop a triggering signal.

4. A crash sensor according to claim 1 or 2, wherein the predetermined time function value is varied in response to a speed of said vehicle from a speedometer directly before the crash.

5. A crash sensor according to claim 1 or 2, wherein a K-th power of an acceleration waveform is inputted as the acceleration waveform.

6. A crash sensor according to claim 1 or 2, wherein the time integration is n-th time integration.

7. A crash sensor according to claim 1 or 2, wherein an amplified acceleration waveform is inputted as the acceleration waveform.

8. A crash sensor according to claim 1 or 2, wherein a waveform obtained by subtraction from an acceleration waveform obtained by means of a filter processing from the acceleration waveform is inputted as the acceleration waveform.

9. A crash sensor according to claim 1 or 2, wherein the time integrating operation is reset when the time integrated value to be compared with the predetermined time function value comes to a value around zero.

10. A crash sensor which detects a vehicle crash from an acceleration waveform of an accelerometer to trigger the operation of a passenger protecting apparatus, comprising:

means for separating said waveform into positive peaks representing a vehicle deceleration in excess of a first predetermined threshold deceleration value and a bottom portion representing decelerations not in excess of said first predetermined threshold deceleration value, said positive peaks defining a positive area between said acceleration waveform and a line representing said first threshold deceleration value and said bottom portion defining a negative area between said acceleration waveform and said line representing said first threshold deceleration value;

means for cutting from said negative area all values between a second threshold deceleration value and said acceleration waveform to leave a smaller negative area;

means for integrating said positive area and said smaller negative area to produce an integration curve; and means for comparing values from said integration curve with values from a predetermined time function to develop a triggering signal when the integration curve value exceeds the predetermined time function value.

* * * * *